March 2, 1937.  R. E. STARK  2,072,691
AERATING APPARATUS
Filed Dec. 26, 1933  3 Sheets-Sheet 2
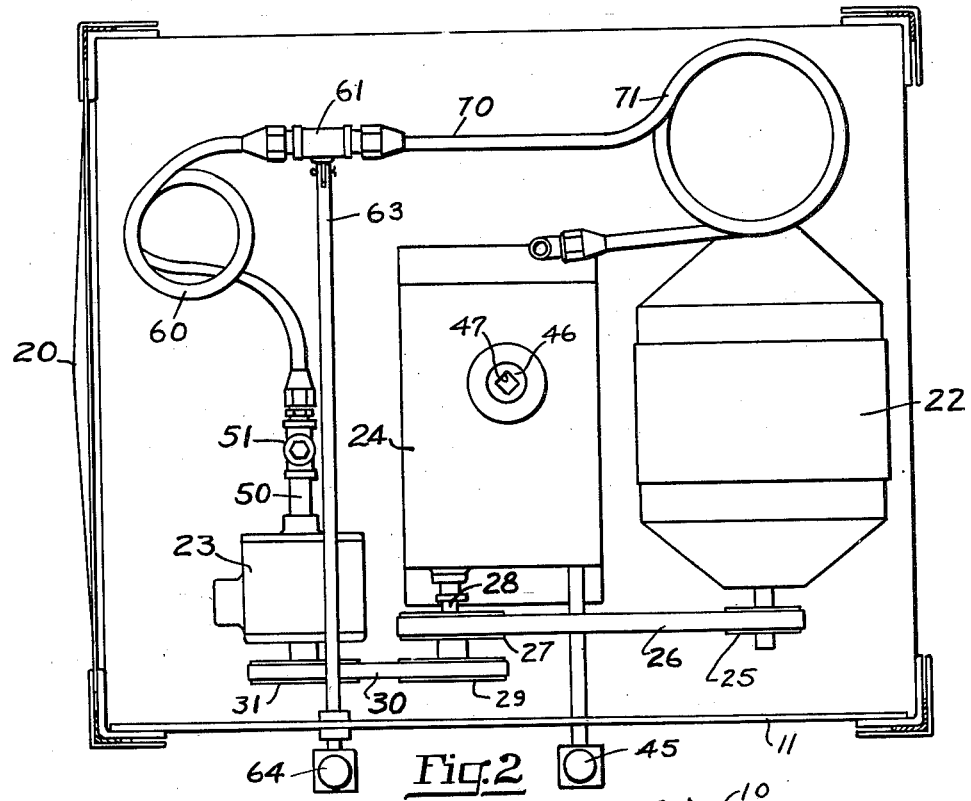
Fig. 2
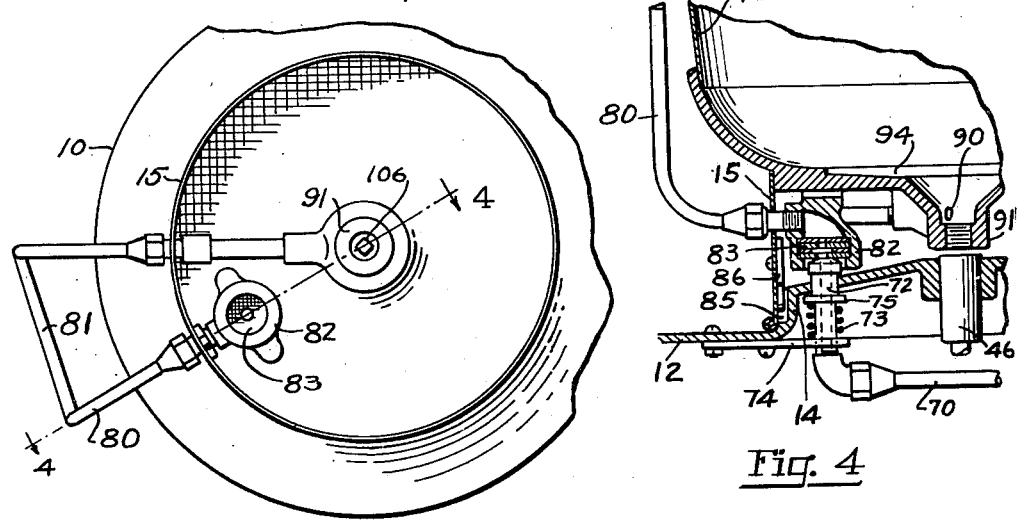
Fig. 3
Fig. 4
INVENTOR
Rawson E. Stark
BY
Maréchal and Noe
ATTORNEY March 2, 1937. R. E. STARK 2,072,691
AERATING APPARATUS
Filed Dec. 26, 1933 3 Sheets-Sheet 3
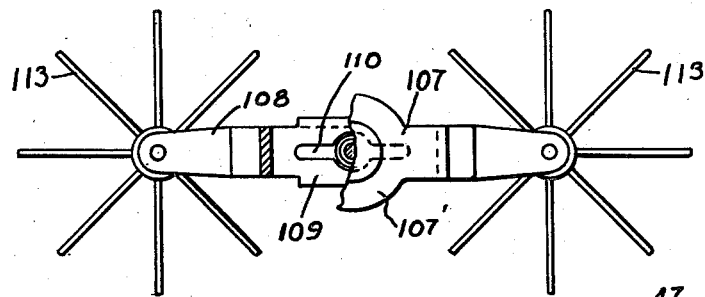
Fig. 5
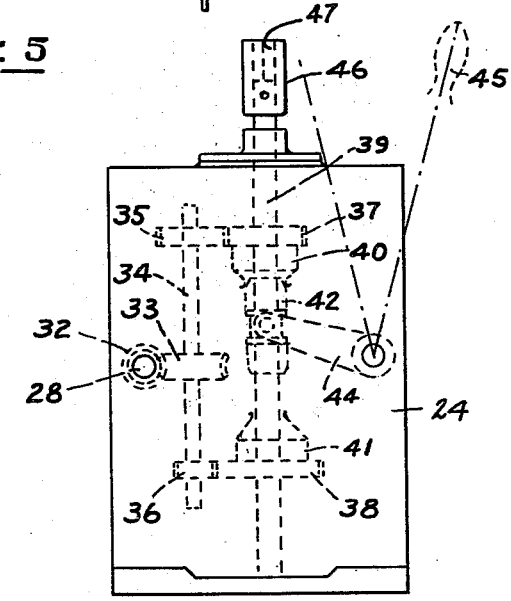
Fig. 7
Fig. 6
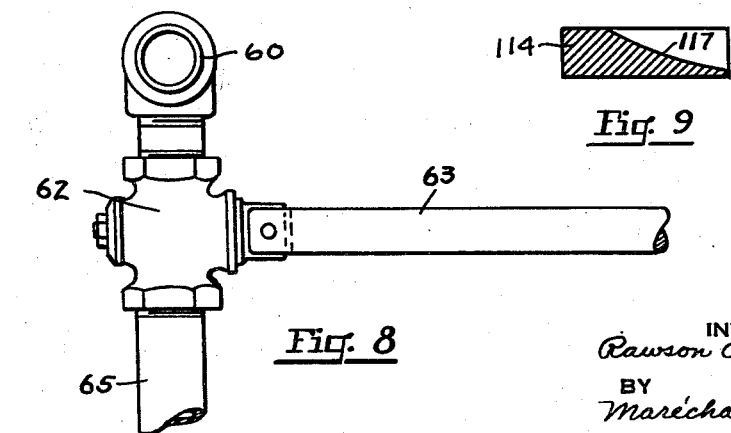
Fig. 8
Fig. 9
INVENTOR
Rawson E. Stark
BY
Maréchal and Noe
ATTORNEY Patented Mar. 2, 1937

2,072,691

UNITED STATES PATENT OFFICE 2,072,691

AERATING APPARATUS

Rawson E. Stark, Carnegie, Pa., assignor to The Hobart Manufacturing Company, Troy, Ohio, a corporation of Ohio Application December 26, 1933, Serial No. 703,926

21 Claims. (Cl. 99—60)

This invention relates to aeration of liquids, and more particularly to the whipping of cream.

It is the principal object of the invention to provide a very simple and effective method of preparing whipped cream to produce predetermined characteristics in the finished whipped cream product.

It is a further object to provide a simple and efficient apparatus for preparing whipped cream to produce predetermined characteristics in the finished whipped cream product.

It is a further object to provide apparatus for aerating and whipping of cream, and power driven mechanism for stirring the cream during such aeration, both the aerating means and the stirring means being under the control of the operator.

Other objects and advantages will be apparent from the description, the accompanying drawings, and the appended claims.

In the drawings,—

Fig. 2 is a plan view of the base of the machine showing the arrangement of the operating mechanisms;

Fig. 3 is a view looking upwardly toward the bottom of the cream container;

Fig. 4 is a fragmentary view of a section of the line 4—4 of Fig. 3;

Fig. 5 is a horizontal sectional view along the line 5—5 of Fig. 1;

Fig. 6 is an elevational view of the speed reducing mechanism;

Fig. 7 is a view in section of the air pressure relief valve;

Fig. 8 is a view of the pressure control valve; and

Fig. 9 is a sectional view showing a detail of the construction and taken on the line 9—9 of Fig. 1.

Figure 1:
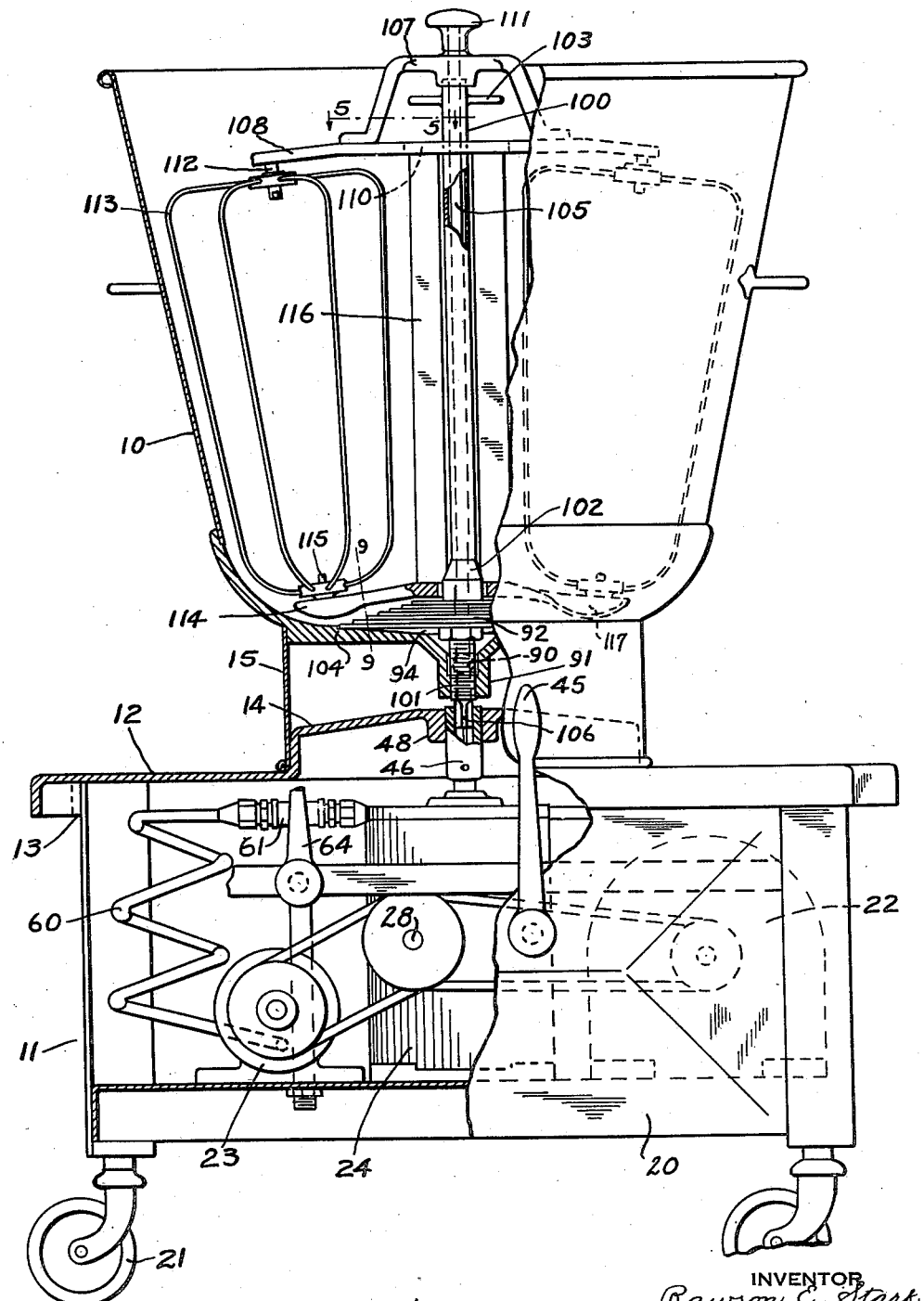
Fig. 1 shows a view in elevation, with certain parts being broken away, of a machine for whipping cream embodying the present invention.

Referring to the drawings which disclose a preferred embodiment of the invention, there is shown a cream whipping device comprising preferably two units, the first a cream container 10, and the second a base 11 upon which the cream container is removably supported. The base 11 is provided with a top cover member 12 having depending overhanging flanges 13 and a central annular raised portion 14 of the proper size to receive the depending annular supporting flange 15 of the container 10.

Within the base 11, which is preferably enclosed by walls 20 and mounted upon casters 21, there is positioned a source of motive power 22, such as an electric motor. There is also provided an air pump 23 for supplying air under suitable pressure for aerating and whipping the cream which preferably is of the rotary type so that it can operate at substantially the same speed as the motor to eliminate the necessity for a speed reducing mechanism for driving the pump. A stirring mechanism is also provided for stirring the cream during the whipping operation and since it is desirable to operate the stirring mechanism at a controlled speed much slower than the usual motor speed, a speed reducing and speed changing mechanism 24 is also positioned within the base, and suitable driving connections are provided between the motor 22 and the air pump and speed reducing mechanism. As shown, this driving connection comprises a driving pulley 25 on the motor, a belt 26, and a driven pulley 27 on the shaft 28 of the speed reducing mechanism. On the same shaft there is also mounted pulley 29 which drives the air pump through belt 30, and pulley 31.

The speed reducing mechanism 24 is preferably a self-contained unit embodying change speed gearing therein. As indicated, this unit comprises the driving shaft 28 to which is attached a worm 32 meshing with worm gear 33. The worm gear is fixed to countershaft 34 which carries a large gear 35 and a small gear 36. Gear 35 meshes with a cooperating gear 37, and gear 36 similarly meshes with cooperating gear 38, gears 37 and 38 being freely rotatable on shaft 39. Each gear 37 and 38 is provided with a clutch member 40 and 41 respectively and a sliding clutch operating member 42 is arranged in the usual manner to cause selective driving engagement of one or the other gear train with the driven shaft 39. The gear train 36, 38 therefore provides a slow speed drive, while gear train 35, 37 provides a higher speed drive. A control shift lever 44 provides for engaging one or the other gear train, and a handle member 45 is positioned conveniently for the operator, to enable the selection of a desired driving speed. The driven shaft 39 extends upwardly and terminates in a driving socket 46, preferably having a non-circular socket 47 therein. The driving socket extends upwardly into a boss 48 provided within the upstanding section 14 of the cover.

The air pump 23, driven as above described, supplies air at a suitable pressure to suffice for all conditions under which the device is operated. An air conduit 50 leads from the pump and preferably a pressure relief mechanism 51 is provided in this line to avoid production of too high a pressure such as might damage the pump, or cause objectionable flexing in the aerating discs, to be hereinafter described, such as to distort the discs or cause excessive leakage. This pressure relief mechanism, as shown in Fig. 7, comprises a check valve 52 mounted within a casing 53 and is pressed toward its seat over the air passage 54 by means of a spring 55. Tension of the spring is adjustable by means of the adjusting screw 56. When the pressure exceeds that for which the spring has been set, the valve will rise and permit exhaust of the air through the ports 57.

The air conduit is formed with a plurality of coils 60 which are adapted to provide flexibility in the air line, and also provide for the condensation of any moisture which may be fortuitously present in the compressed air. A control valve 61 is provided in the air line for the purpose of regulating the pressure and the quantity of air delivered to the aerating device. This control valve comprises a valve chamber 62 and an extended valve operating arm 63, which is extended to the outside of the base structure and terminates in an operating handle 64 conveniently within the reach of the operator and adjacent the speed control lever 45, so that the operator can operate both controls quite readily as desired. Operation of the control handle 64 causes the by-passing of a portion of compressed air through an exhaust pipe 65 thereby reducing the quantity and pressure of the air to obtain the desired controlling effect. Alternately, a throttling type valve may be used.

Air conduit 70 communicates with the reducing valve, and is formed with a curved section 71 to provide desired flexibility and resiliency, and also to further condense any moisture present in the air, and also to provide for radiating heat caused by the compression of the air so that the air will be relatively cooler as it enters the cream. The conduit 70 terminates in an upstanding member 72 which passes through the cover section 14, eccentrically of the center thereof. A spring 73 acting against a support 74 attached to the main cover member 12, and cooperating with a flanged section 75 of member 72, tends to urge the member 72 upwardly, this upward motion being limited by engagement of flange 75 with the under side of cover 14. The coil portion 71 of the air conduit has sufficient resiliency to readily permit a desired springing of the conduit and a consequent upward and downward movement of the end member 72 of the conduit.

The container 10 carries a cooperating air conduit 80 which is preferably given an upward curved formation as indicated at 81, so as to extend above the normal level of the liquid cream, thereby preventing any possibility of liquid passing from the container into the air pump. The air conduit 80 passes through the depending flange 15 of the cover and terminates in a downturned enlarged section 82. Mounted within this enlarged section are a plurality of resilient sealing members 83, such as a plurality of apertured rubber disks. These disks are adapted to cooperate with the end member 72 of the lower air conduit when the container is placed in operative position upon the base, to form a substantially air-tight seal, providing for the passage of the air from conduit 70 to the conduit 80 under pressure, while also providing for the ready removal from and assembly of the upper container upon the base. When the parts are in operative position as shown in Fig. 4, the lower member 72 is somewhat depressed from its uppermost position against the pressure of spring 73, and there is thus formed a substantial pressure tending to seal the member 72 against the rubber disks 83.

In order to assure the proper alignment of these two air conduits, the cover section 14 of the base is provided with an indexing groove 85, and the depending flange 15 of the container is provided with a cooperating indexing finger 86, the construction being such that the container can be assembled upon the base only in the proper angular relationship so that the air conduits are in registration.

Air conduit 80 communicates through an aperture 90 formed in a depending neck portion 91 of the base of the container.

An aerating structure 92 is positioned within the base of the container. This structure preferably comprises a series of metal disks of progressively decreasing diameter, mounted one upon another, and having small scores or grooves upon their adjacent flat faces which are adapted to divide up air passed through the plates from below, into a plurality of finely divided streams of bubbles capable of aerating or whipping the cream. If desired a structure such as disclosed in my copending application, Serial No. 681,972, filed July 24, 1933, and assigned to the same assignee as this application, may be used. The bottom wall of the container is provided with a depression 94 within which the series of aerating disks is positioned. As shown the bottom of this depression is slightly dished or tapered downwardly and the lowermost of the aerating disks seats against this surface and is flexed downwardly to have its peripheral portion pulled tightly in sealing relationship against this surface, as shown particularly in Fig. 1. This downward flexing of the aerating disks, and the holding of the disks tightly in proper position with respect to each other during operation, is effected by means of the central tubular shaft 100 which extends downwardly through the container and through the superposed disks, and has its lower end terminating in a threaded portion 101 which is threadedly engaged within the lower neck 91 of the container. If desired a peripheral sealing member, such as a suitable flexible ring, may be positioned between the periphery of the lower plate and the bottom of the depression, to provide a seal, either in lieu of the sealing resulting from the flexing of the lower disk against the downwardly dished surface above referred to, or as supplementary thereto. As shown particularly in Fig. 1 the diameter of the depression above referred to is somewhat greater than the outside diameter of the lowest of the aerating disks 92, thus leaving a circular space within the depression and around the outside of the lowermost disk. By means of this construction the aerating channels carried in the lower face of the lowest disk are available for the discharge of air therethrough, thus giving greater air capacity. Furthermore, air as thus discharged passes into the circular channel 104 and serves to prevent cream or other material from collecting within that channel to thus prevent material from working down into a position where it would tend to leak between the aerating disk and the bottom of the container.

An enlarged collar 102 is formed on the tube overlying the series of disks, which provides for the application of suitable pressure thereto when the tube is screwed downwardly into the bottom of the container, thereby maintaining the aerating disks in proper operative position and making an effective fluid seal. The tube terminates adjacent the upper portion of the container and above the normal level of the cream, so that a sanitary construction is provided. The tube is also formed with extending pins 103 which provide a ready means for threading the tube into the base of the container.

A driving shaft 105 extends through the tube 100 and projects beyond the bottom of the tube, terminating in a non-circular shaft portion 106 which is adapted to have driving engagement with the upstanding socket 46 of the base member, also providing for the ready disassembly of the driving connection upon the removal of the container from the base. The shaft 105 extends upwardly and is attached in driving relation to yoke 107. The yoke is supported upon the end of tube member 100 and is adapted to be rotated thereon by means of the driving shaft 105. The yoke carries an upper cross arm 108 which has a central section 109 suitably apertured for sliding engagement over the tube 100. Yoke 107 is provided with a circular extension 107' which serves as a guard between the rotating yoke and the stationary members 103. This section is also provided with elongated slots 110 which provide for the passage therethrough of the members 103 when it is desired to remove the stirring device from the container; likewise this construction provides for raising the stirring mechanism from the container to slide it over the members 103, and thereafter by slightly turning the stirring mechanism, it will be supported upon the members 103. The handle 111 attached to the yoke 107 provides for this lifting movement.

The upper supporting arms 108 extend radially and are provided with bearings 112 for rotatably supporting a plurality of stirring frames 113. A lower supporting arm 114 is similarly formed with bearings 115, the lower arm being carried in spaced relation with respect to the upper arm by members 116. These members have a dual function of supporting the lower arm and of providing a stirring action for the material adjacent the tube which otherwise might not be circulated. The lower supporting arm 114 is centrally apertured to pass asound and be guided by the enlargement 102, and is also provided with slots, not shown, but similar in positioning and functioning to the slots 110 in the upper arm. The lower arm 114 passes directly over the aerating structure 92 and is preferably formed with beveled surface 117 (Fig. 9) which exerts a plow-like action tending to prevent formation of air tunnels or fissures in this zone.

The arrangement above described permits of lowering the stirring mechanism into proper position, as above set out, for the stirring action. By lifting the stirring mechanism so that the slot 110 in the member 108 passes upwardly above the pins 103 as above described, and slightly rotating the mechanism, it will be supported upon these pins for disengaging the stirring mechanism from its driving connections. When it is desired to strip adhering cream from the rotating members, the stirring mechanism may be lifted still further so that the corresponding slot in the member 114 will pass above the pins 103 whereupon slight angular rotation will bring the slot out of register with the member 103 so that the stirring mechanism will be supported in this elevated position and the cream may be readily stripped therefrom.

As will be evident from the drawing in Fig. 1, the container is preferably formed with upwardly diverging side walls. The stirring frames 113 are so formed as to have a larger diameter at the top than at the bottom, and are so positioned within the container that their axis approximately bisects the angle formed by the wall of the container and its central vertical axis. As a result therefore, the outer portion of the frame is substantially parallel with the periphery of the container, while the inner section is substantially parallel with the axis of the container so that practically the entire body of the cream is subjected to the stirring action. As will be apparent from the above, the frames 113 are freely rotatable upon their axes, but are not positively driven.

The operation of the device is substantially as follows. A quantity of cream is placed within the container 10, which may not be in position upon the base. Although no air is immediately passed upwardly through the aerating structure, because of the character of the passages, downward passage of the cream therethrough is substantially prevented. When the container is filled and in place in proper registering relation upon the base, both the air conection and the driving connection are established as above described. The aeration may then be started by the operation of the driving motor causing operation of the pump with consequent supplying of air to the air chamber below the aerating structure, and passage therethrough to effect whipping of the cream. The control member 64 is suitably adjusted to provide the desired rate of supply of air.

Either simultaneously, or subsequently, the clutch member 45 can be engaged by the operator to cause driving engagement of the shaft 105 and consequent rotation of the stirring mechanism in the container. As a result of this rotation, the frames are caused to have a rotation about their own axes in such manner that a substantially uniform stirring action is provided throughout the container. This stirring action is effective to thoroughly break up or prevent the large bubble formation or the occurrence of fissures or air tunnels in the cream being whipped, so that in conjunction with the plow-like action of the members 114, objectionable escape of air without proper whipping of the cream is avoided, and a finer grained whipped cream is obtained. The speed of operation of the stirring members may be selected as desired from no speed or very slow speed up to the maximum speed which will not deleteriously affect the material being aerated.

The whipping qualities of cream are known to vary materially with the butter fat content of the cream, a cream rich in butter fat whipping more easily than a cream poor in butter fat. And also it is desirable to produce cream having different characteristics, adapting it for different characters of use. It has been found that by a proper coordination of the rate of air supply to the cream, and the amount of stirring or mixing action produced therein, a wide range of physical characteristics can be provided in the whipped cream, from cream of widely varying butter fat content. Cream so low in butter fat that it could not be whipped by the ordinary processes can be effectively whipped with the present invention and furthermore can be made to have predetermined characteristics of large bulk and long lasting qualities. In certain cases, where it is primarily desirable to use a relatively inexpensive low butter fat cream, and to produce a large volume of whipped cream therefrom, a reduced amount of stirring action, sufficient to prevent overflow of the container is employed. Under other circumstances, where a very fine grained whipped cream is desired, a more extended and/or a higher stirring action may be employed which serves to break down the larger formed bubbles and keep them of small size which results in a less bulky whipped cream, but one which will have much greater lasting or standing power.

Generally it is found that with a higher butter fat content, a smaller air supply should be used as the higher butter fat content makes the cream more viscous and less of the air is lost. Conversely, with a low butter fat cream, having less viscosity, it is desirable to supply the air at a greater rate, to offset the losses occurring by escape of air through the cream.

The stirring action may occur simultaneously with or subsequent to the aerating action. Ordinarily it is desirable to first start the aerating action to produce a preliminary whipping effect, and then to begin the stirring action and to regulate the rate of such stirring action to produce the desired bulk and fineness characteristics in the finished whipped cream.

Upon the completion of the whipping operation, the entire stirring mechanism may be lifted from its operative position and supported upon the pins 103, thereby providing sufficient space at the side of the container to permit the removal of the whipped cream. It is usually undesirable to completely remove this stirring mechanism because considerable whipped cream clings to it. It may, however, be removed directly when desired for cleaning purposes. The device may also be used repeatedly to aerate successive batches of material without removing the stirring mechanism so that it does not contact any other material and a sanitary condition is maintained. Furthermore, the entire container together with the aerating disks can be cleaned and the disks separately washed and dried before reassembly.

While the methods herein described, and the forms of apparatus for carrying these methods into effect, constitute preferred embodiments of the invention, it is to be understood that the invention is not limited to these precise methods and forms of apparatus, and that changes may be made in either without departing from the scope of the invention which is defined in the appended claims.

What is claimed is:

1. The method of preparing whipped cream which comprises the steps of aerating the liquid cream by the introduction of air in finely divided streams of bubbles thereinto to produce a preliminary whipping action, and continuing the introduction of the air streams into the cream to complete the whipping thereof while simultaneously stirring the same at a rate coordinated with the rate of introduction of air to obtain a cream having predetermined characteristics.

2. The method of preparing whipped cream which comprises the steps of introducing air in finely divided streams of bubbles into the cream to produce a preliminary whipping action, thereafter stirring the whipped cream to produce predetermined stiffness characteristics in the finished product, and simultaneously introducing air in reduced amount to the cream to complete the whipping thereof.

3. The method of preparing whipped cream which comprises the steps of introducing air in finely divided streams of bubbles into the cream to produce a preliminary whipping action, thereafter reducing the quantity of air introduced into the cream, and stirring the cream during the introduction of the reduced supply of air at a coordinated speed in relation to the butter fat content of the cream and the rate of air admission, to obtain a finished whipped cream having predetermined desired characteristics.

4. Apparatus for preparing whipped cream and the like comprising a base, a power driven air pump in said base, a container mounted on said base for holding the cream to be whipped, means for introducing compressed air delivered by said pump into the cream within said container in finely divided streams of bubbles to produce a whipping action therein, said air introducing means substantially preventing passage of liquid cream therethrough, means for producing a stirring action within said container, and means in said base beneath air introducing means and extending therethrough in liquid sealed relation into the container for driving said stirring means.

5. Apparatus for preparing whipped cream and the like which comprises a container for holding a quantity of cream to be whipped, means for introducing air in finely divided streams of bubbles into the cream to produce a whipping action therein, and power driven stirring means operable within said container with a composite rotary motion about a plurality of axes for producing a substantially uniformly effective stirring action in the cream.

6. Apparatus for preparing whipped cream and the like which comprises a base, a container removably mounted on said base for holding a quantity of cream to be whipped, an air pump mounted in said base, means for introducing air from said pump in finely divided streams of bubbles into the cream to produce a whipping action therein, said air introducing means being adapted to substantially prevent passage of liquid cream therethrough, stirring mechanism in said container, and means in said base including a detachable connection extending through said air introducing means in liquid sealed relation therewith for driving said stirring mechanism.

7. Apparatus for preparing whipped cream comprising a container for holding a quantity of cream to be whipped, an air pump, means for introducing the air supplied by said pump into the cream in finely divided streams of bubbles to produce a whipping action therein, stirring mechanism mounted within the container including a power-like arm movable in said cream directly over said air introducing means for preventing formation of air tunnels or fissures, and a single power source for operating both said stirring means and said pump.

8. Apparatus for preparing whipped cream comprising a container adapted to hold a quantity of cream to be whipped, means adjacent the bottom of said container for introducing air in finely divided streams of bubbles thereinto to produce a whipping action therein, an air pump for supplying air under pressure to said air introducing means, stirring mechanism rotatably supported in said container, and a power source, and driving connections between said power source, said air pump, and said stirring mechanism including change speed gearing for driving said stirring mechanism at a predetermined speed.

9. Apparatus for preparing whipped cream comprising a container for holding a quantity of cream to be whipped, a base for removably supporting said container, an air pump in said base, an air conduit mounted in said base and connected to said air pump, said air conduit terminating in a connection spaced radially from the axis of said container, means in said container for distributing air supplied thereto into the cream in finely divided streams of bubbles, an air conduit in communication with said air distributing means extending to the exterior of said container and terminating in a connection having a radial positioning corresponding to said first mentioned connection, said air conduit connections having sealing means providing for quick separation when said container is removed from said base and establishment of an air pressure transmitting connection when the container is in operative position upon said base.

10. Apparatus for preparing whipped cream comprising a container for holding a quantity of cream to be whipped, a base for removably supporting said container, cooperating locating members on said base and on said container providing for the assembly of said parts in a predetermined relative positioning, air supply means in said base, a conduit in said base communicating with said air supply means and terminating in an open end section, air distributing means in said container, a cooperating air conduit carried by said container and arranged to supply air to said air distributing means, said last mentioned air conduit likewise terminating in an open end section and being arranged to register with said first mentioned air conduit when the container is placed in said predetermined positioning upon the base, both said air conduits being located non-axially of the container.

11. Apparatus for preparing whipped cream comprising a container for holding a quantity of cream to be whipped, a base for removably supporting said container, cooperating locating members on said base and on said container providing for the assembly of said parts in a predetermined relative positioning, air supply means in said base, a conduit in said base communicating with said air supply means having an open end section, air distributing means in said container, a cooperating air conduit carried by said container and adapted to supply air to said air distributing means, said last mentioned air conduit likewise having an open end section and being arranged to register with said first mentioned air conduit when the container is placed in said predetermined positioning upon the base, both said air conduits being located non-axially of the container and yieldable means for maintaining a substantially fluid tight connection between said registering air conduits while permitting quick separation thereof and the removal of the container from said base.

12. Apparatus for preparing whipped cream which comprises a container for holding a quantity of cream to be whipped, a base for removably supporting said container, stirring mechanism within said container, a central tubular member providing a rotatable support for said stirring mechanism, a shaft extending through said tubular member for driving said stirring mechanism and having a driving connection adjacent its lower end, and driving mechanism within said base for engaging said shaft to drive said stirring mechanism.

13. Apparatus for preparing whipped cream which comprises a container for holding a quantity of cream to be whipped, stirring mechanism mounted within said container comprising top and bottom supporting members, a plurality of stirring frames rotatably mounted within said supporting members eccentrically of the container axis, means for mounting said supporting arms to provide for rotation thereof substantially along the axis of said container, whereby said frames are carried around within the container with resultant rotation of each frame on its own axis.

14. Apparatus for preparing whipped cream comprising a container for holding a quantity of cream to be whipped, a plurality of aerating disks having minute grooves on their surfaces and adapted to introduce air into said container in a plurality of finely divided streams of bubbles, a tubular member passing through a central aperture in said disks and removably fastened to the base of the container, a shoulder on said tubular member overlying said disks to exert pressure thereon when the tubular member is tightened into the base of the container, stirring mechanism rotatably supported in said container, and a driving shaft for driving said stirring mechanism passing through said tubular member.

15. Apparatus for preparing whipped cream comprising a container for holding a quantity of cream to be whipped, means for introducing air in finely divided streams of bubbles into the cream to produce a whipping action therein, a stirring mechanism within said container, means for supporting said stirring mechanism for rotation within said container, means for rotating said mechanism and means for retaining said mechanism in a raised position within said container disengaged from said rotating mechanism.

16. An aerating device of the character described comprising a container for holding a quantity of liquid foodstuff to be aerated, means for introducing air into said liquid foodstuff in finely divided streams of bubbles to effect aeration thereof, stirring mechanism mounted within said container including a rotatable shaft, and a stirring member mounted for rotation about said shaft and also about an axis spaced from said rotatable shaft to provide a homogeneously effective stirring action through said body of liquid.

17. An aerating device of the character described comprising a container for holding a quantity of liquid foodstuff to be aerated, means for introducing air into said liquid foodstuff in finely divided streams of bubbles to effect aeration thereof, and stirring mechanism mounted within said container including supporting arms rotatable about an axis, a stirring member supported in said arms and freely rotatable about an axis spaced from the axis of rotation of said arms, said member being carried around in said container by said arms and rotated on its own axis by reaction on the liquid foodstuff material within the container to provide a homogeneously effective stirring action therein.

18. Apparatus for preparing whipped cream and the like comprising a base, a container mounted on said base for holding a quantity of cream to be whipped, means located at the bottom of said container for introducing air in finely divided streams of bubbles into the cream to produce a whipping action therein, stirring mechanism operable within said container, a power source located in said base, a tube passing through the bottom of said container in liquid sealed relation thereto and extending from said base to above the normal level of the liquid in the container, and drive means extending through said tube in fluid sealed manner for interconnecting said power source and said stirring mechanism.

19. An aerating device of the character described comprising a container for holding a quantity of liquid foodstuff to be aerated, means for introducing air into said liquid foodstuff, and stirring mechanism mounted within said container including a substantially central shaft having spaced supporting arms in the upper and lower parts of said container respectively, means for rotating said shaft and said arms, and a stirring frame freely rotatably mounted in said spaced arms upon an axis spaced from the axis of said shaft, said stirring frame extending substantially from said shaft to the wall of the container and being rotated upon its own axis by reaction on the liquid foodstuff material within the container.

20. An aerating device of the character described comprising a base, a container mounted upon said base for holding a quantity of liquid foodstuff to be aerated, a power source located in said base, a tube passing through said container in fluid sealed relation thereto and extending above the normal liquid level therein, drive means operated by said power source and extending through said tube, stirring mechanism interconnected with said drive means and operable within said container, said stirring mechanism including rotatable supporting arms and a stirring member freely rotatably mounted in said supporting arms upon an axis spaced from the axis of rotation of said arms.

21. An apparatus of the character described comprising a base, a container removably mounted upon said base for holding a quantity of liquid foodstuff, a power source in said base having a driving connection, stirring mechanism operably mounted within said container, and detachable driving means interconnecting said power source and said stirring mechanism including a tube passing through said container in fluid sealed relation thereto and extending above the normal level of said liquid foodstuff therein, and a drive shaft operably connected with said stirring mechanism and extending through said tube in detachable engagement with said driving connection.

RAWSON E. STARK.

CERTIFICATE OF CORRECTION.

Patent No. 2,072,691.   March 2, 1937.

RAWSON E. STARK.

It is hereby certified that error appears in the printed specification of the above numbered patent requiring correction as follows: Page 3, first column, line 48, for "asound" read around; and second column, line 23, for "conection" read connection; page 4, first column, line 1, after "higher" insert the word speed; and second column, line 50, claim 7, for "power-like" read plow-like; and that the said Letters Patent should be read with these corrections therein that the same may conform to the record of the case in the Patent Office.

Signed and sealed this 30th day of March, A. D. 1937.

(Seal)
Henry Van Arsdale
Acting Commissioner of Patents.